United States Patent
Leighton et al.

(10) Patent No.: US 8,846,174 B2
(45) Date of Patent: Sep. 30, 2014

(54) TRANSPARENT LAMINATE STRUCTURES

(75) Inventors: Katherine T Leighton, Media, PA (US); Edgar L Aleshire, Chesapeake City, MD (US); Theodore A Wegert, Louisville, KY (US); Wiktor Serafin, Newark, DE (US); Christopher M Snively, Clarks Summit, PA (US); John Carberry, Talbot, TN (US); Eric Urruti, Duryea, PA (US); Rebecca S Neill, Wilmington, DE (US)

(73) Assignee: Schott Corporation, Elmsford, NY (US)

( * ) Notice: Subject to any disclaimer, the term of this patent is extended or adjusted under 35 U.S.C. 154(b) by 266 days.

(21) Appl. No.: 13/404,849

(22) Filed: Feb. 24, 2012

(65) Prior Publication Data

US 2012/0219749 A1   Aug. 30, 2012

Related U.S. Application Data

(60) Provisional application No. 61/446,623, filed on Feb. 25, 2011.

(51) Int. Cl.
| | |
|---|---|
| B32B 27/08 | (2006.01) |
| B32B 15/00 | (2006.01) |
| B32B 18/00 | (2006.01) |
| F41H 5/04 | (2006.01) |
| C04B 37/00 | (2006.01) |
| B32B 17/10 | (2006.01) |
| B32B 27/36 | (2006.01) |
| C04B 35/634 | (2006.01) |
| C04B 37/02 | (2006.01) |
| C04B 37/04 | (2006.01) |

(52) U.S. Cl.
CPC .............. B32B 18/00 (2013.01); F41H 5/0407 (2013.01); C04B 37/008 (2013.01);
(Continued)

(58) Field of Classification Search
USPC ....................................... 428/76, 68
See application file for complete search history.

(56) References Cited

U.S. PATENT DOCUMENTS

| | | |
|---|---|---|
| 1,845,133 A | 2/1832 | Davis, Jr. |
| 782,302 A | 2/1905 | Williams |

(Continued)

FOREIGN PATENT DOCUMENTS

JP        2008037018        2/2008

OTHER PUBLICATIONS

Makrolon® Technical Information, File No. KU28057-0409 en, Issue Sep. 28, 2004.

(Continued)

*Primary Examiner* — Brent O'Hern
(74) *Attorney, Agent, or Firm* — Ohlandt, Greeley, Ruggiero & Perle, LLP (57) ABSTRACT

A transparent laminate structure is provided that includes two transparent layers, a transparent interlayer, and an inorganic barrier layer. The two transparent layers each have an inner face and a side edge. The transparent interlayer is between and laminates the inner faces of the two transparent layers to one another. The transparent interlayer also extends over the side edges of the two transparent layers and laminates the inorganic barrier layer to at least the side edges of the two transparent layers.

27 Claims, 7 Drawing Sheets

(52) U.S. Cl.
CPC ....... B32B 17/10761 (2013.01); *C04B 2237/36* (2013.01); *C04B 2235/32* (2013.01); *C04B 2237/402* (2013.01); B32B 27/365 (2013.01); *C04B 2237/403* (2013.01); C04B 35/63424 (2013.01); C04B 37/028 (2013.01); C04B 35/63456 (2013.01); *C04B 2235/6581* (2013.01); *B32B 2307/412* (2013.01); B32B 17/10036 (2013.01); *C04B 2237/406* (2013.01); C04B 35/63408 (2013.01); B32B 17/10302 (2013.01); *C04B 35/6342* (2013.01); *C04B 2235/9653* (2013.01); B32B 17/1077 (2013.01); *C04B 2237/346* (2013.01); *C04B 2237/704* (2013.01); *C04B 2235/483* (2013.01); *C04B 2237/407* (2013.01); C04B 35/63488 (2013.01); *C04B 2237/366* (2013.01); *C04B 2237/706* (2013.01); *C04B 2237/80* (2013.01); C04B 37/047 (2013.01); *B32B 2369/00* (2013.01); *C04B 2237/368* (2013.01); *C04B 2237/405* (2013.01); *C04B 2237/72* (2013.01); *C04B 2237/341* (2013.01); *C04B 2237/34* (2013.01)
USPC .............................. 428/76; 428/68

(56) References Cited

U.S. PATENT DOCUMENTS

| | | | |
|---|---|---|---|
| 3,388,032 A | 6/1968 | Saunders | |
| 3,640,937 A | 2/1972 | Thoma et al. | |
| 3,933,552 A | 1/1976 | Shumaker | |
| 3,965,057 A | 6/1976 | Ammons et al. | |
| 4,177,099 A * | 12/1979 | Radzwill | 156/88 |
| 4,364,786 A * | 12/1982 | Smith et al. | 156/99 |
| 4,555,450 A | 11/1985 | Uram, Jr. | |
| 4,594,290 A | 6/1986 | Fischer et al. | |
| 4,600,640 A | 7/1986 | Olson | |
| 4,911,061 A | 3/1990 | Pivitt et al. | |
| 4,969,386 A | 11/1990 | Sandstrom et al. | |
| 5,045,371 A | 9/1991 | Calkins | |
| 5,346,752 A | 9/1994 | Sawada et al. | |
| 5,536,347 A | 7/1996 | Moran | |
| 6,327,954 B1 | 12/2001 | Medlin | |
| 6,387,477 B1 | 5/2002 | Ogura et al. | |
| 6,548,177 B2 | 4/2003 | Hieda et al. | |
| 6,601,497 B2 | 8/2003 | Ghiorse et al. | |
| 6,737,151 B1 * | 5/2004 | Smith | 428/192 |
| 6,818,268 B2 | 11/2004 | Gonzalez | |
| 6,921,509 B2 | 7/2005 | Moran et al. | |
| 7,069,836 B1 | 7/2006 | Palicka et al. | |
| 7,191,694 B1 | 3/2007 | Gonzalez | |
| 7,201,965 B2 | 4/2007 | Gulati et al. | |
| 7,393,584 B2 | 7/2008 | Haldeman | |
| 7,478,579 B2 | 1/2009 | Carberry et al. | |
| 7,604,876 B2 | 10/2009 | Collier et al. | |
| 7,763,360 B2 | 7/2010 | Paul et al. | |
| 7,771,892 B2 | 8/2010 | Choi | |
| 7,875,356 B2 | 1/2011 | Hilmer et al. | |
| 7,985,481 B2 | 7/2011 | Marumoto | |
| 8,028,612 B2 | 10/2011 | Neal | |
| 2003/0118840 A1 | 6/2003 | Moran et al. | |
| 2006/0159912 A1 | 7/2006 | Haldeman | |
| 2007/0224402 A1 | 9/2007 | Yoshida et al. | |
| 2007/0231577 A1 | 10/2007 | Caillouette et al. | |
| 2008/0032104 A1 | 2/2008 | Mannheim Astete et al. | |
| 2009/0324858 A1 | 12/2009 | Jaeger | |

OTHER PUBLICATIONS

DuPont Butacite® Product Information, 2009.
Ibis Tek Brochure Distributed at AUSA shoe in Oct. 2009.
International Search Report dated Aug. 3, 2012 for PCT application No. PCT/US2012/026598.
Written Opinion dated Aug. 3, 2012 for PCT application No. PCT/US2012/026598.
International Preliminary Report on Patentability (IPRP) dated Sep. 6, 2013 for PCT application No. PCT/US2012/026598.
Makrolon® Chemical Resistance from Sheffield Plastics dated Sep. 28, 2004.
National Institute of Justice in NIJ Standard 0108.01 for protection up to .030 caliber armor piercing (AP) rounds; Underwriters Laboratory in specification UL752 dated Sep. 1985.
Purchase Specification Transport Armor (ATPD-2352) dated Jul. 7, 2008.
NATO Standards—vol. 1 dated Feb. 2005.
NATO Standards—vol. 2 dated Sep. 2006.
Stevens Urethane SecureSeal Edge Seal ST-3199Es brochure dated Apr. 20, 2004.
MIL-STD-810F—First part dated Jan. 1, 2000.
MIL-STD-810F—Second part dated Jan. 1, 2000.
MIL-STD-810F—Third part dated Jan. 1, 2000.

* cited by examiner

TRANSPARENT LAMINATE STRUCTURES

CROSS REFERENCE TO RELATED APPLICATIONS

This application claims the benefit of U.S. Provisional Application Ser. No. 61/446,623, filed Feb. 25, 2011 the contents of which are incorporated by reference herein in their entirety.

BACKGROUND OF THE INVENTION

1. Field of the Invention

The present disclosure is related to transparent laminate structures. More particularly, the present disclosure is related to transparent laminate structures that resist delamination.

2. Description of Related Art

Transparent laminate structures such as those used in windows and transparent armor are commonly used in a variety of commercial, industrial, and military applications. These structures are typically comprised primarily of glass layers and plastic layers bonded together with polymer interlayers where these interlayers are typically on the order of a magnitude thinner than the glass and plastic layers. The transparent laminate structures can also include a frame, which allows connection of the structure to a vehicle or building. For clarity of discussion the present application shall use the term "transparent laminate structure" to refer to the transparent laminate itself, also known in the art as a "glazing", without any frame component.

The glass layers can be made of glass, glass-ceramics, and combinations thereof. The plastic layers can be made of polycarbonate (PC) or polymethyl methacrylate (PMMA), also known as acrylic glass, which are on the order of the thicknesses of the glass layers. These transparent plastic layers are typically within the structure, protected along their faces from exposure to the environment by the outer glass layers.

The interlayers can be made of a variety of different materials such as, but not limited to aliphatic polyether polyurethanes, polyvinyl butyrals, ethylene/methacrylic acid copolymers, and silicones.

These laminate structures can lose their value when the layers de-laminate from one another and/or when one or more of the layers suffers from a loss in transparency.

For example, the de-lamination of the various layers that make up the structure can reduce the transparency and/or reduce the rigidity of the structure, rendering the structure useless for its intended purpose.

Similarly, the plastic layers can themselves become cloudy and/or lose its structural rigidity. For instance, repeated exposure of polycarbonate to high temperature water vapor can create crazing, which manifests itself as surface clouding and ultimately a loss of physical strength properties. While the transparent plastic layers may be protected along their faces from exposure to the environment by the outer glass layers, the edges of many prior art laminate structures remain the primary area of ingress for water vapor.

In sum, prior art transparent laminate structures are exposed to various environments such as humidity and water, especially when combined with elevated temperature and/or exposure to ultra violate (UV) light, that are known to adversely affect the interlayers and/or the transparent plastic layers.

Accordingly, it has been determined by the present disclosure that there is a continuing need for transparent laminate structures that overcome, alleviate, and/or mitigate one or more of the aforementioned and other deleterious effects of prior art transparent laminate structures.

BRIEF SUMMARY OF THE INVENTION

A transparent laminate structure is provided that has a laminated edge seal. The laminated edge seal advantageously provides longer lasting transparent armor by improving resistance to the ingress of deleterious liquids or vapors into the structure through the side edges both during the manufacturing process and during the service life of the structure.

A transparent laminate structure is provided that includes two transparent layers, a transparent interlayer, and an inorganic barrier layer. The two transparent layers each have an inner face and a side edge. The transparent interlayer is between and laminates the inner faces of the two transparent layers to one another. The transparent interlayer also extends over the side edges of the two transparent layers and laminates the inorganic barrier layer to at least the side edges of the two transparent layers. By inorganic we mean to distinguish from the common polymer film barriers and to include metal and ceramic elements, but also to allow for layers such as glassy layers, silicon dioxide, that are laid down from a precursor oganometallic for example ethyl silicate, or from coloidial silica.

A method of forming a transparent laminate structure is also provided. The method includes disposing a transparent interlayer between two transparent layers and along side edges of the transparent layers; disposing an inorganic barrier layer on the transparent interlayer along the side edges to form a pre-laminate structure; and exposing the pre-laminate structure to a process sufficient to simultaneously cause the transparent interlayer to laminate the two transparent layers to one another and to laminate the inorganic barrier layer to the side edges of the two transparent layers.

A transparent laminate structure is provided that includes two transparent layers and a transparent interlayer. The two transparent layers each have an inner face and include a polycarbonate layer and a second layer comprising a material selected from the group consisting of glass, glass-ceramic, and ceramic. The transparent interlayer is interposed between and laminating the inner faces of the two transparent layers to one another. The transparent interlayer is a hybrid interlayer having a first region having a mixture of polycarbonate and polyurethane in contact with the polycarbonate layer and a second region that is predominantly polyurethane proximate to the second layer.

A transparent laminate structure is also provided that includes two transparent layers each having an inner face, and a transparent interlayer interposed between and laminating the inner faces of the two transparent layers to one another. The transparent interlayer has a TMA onset temperature above 76 degrees Celsius.

A transparent laminate structure is provided that includes transparent polycarbonate spall layer, a transparent silicon dioxide layer, transparent rigid layer, and transparent polyurethane interlayer. The transparent polycarbonate spall layer has an inner face on which the transparent silicon dioxide layer is deposited. The transparent rigid layer has an inner face and the transparent polyurethane interlayer is interposed between and laminates the inner faces of the transparent polycarbonate spall layer and the rigid transparent layer to one another. The rigid transparent layer is glass, glass-ceramic, or ceramic.

The above-described and other features and advantages of the transparent laminate structures of the present disclosure

DETAILED DESCRIPTION OF THE INVENTION

Figure 1:
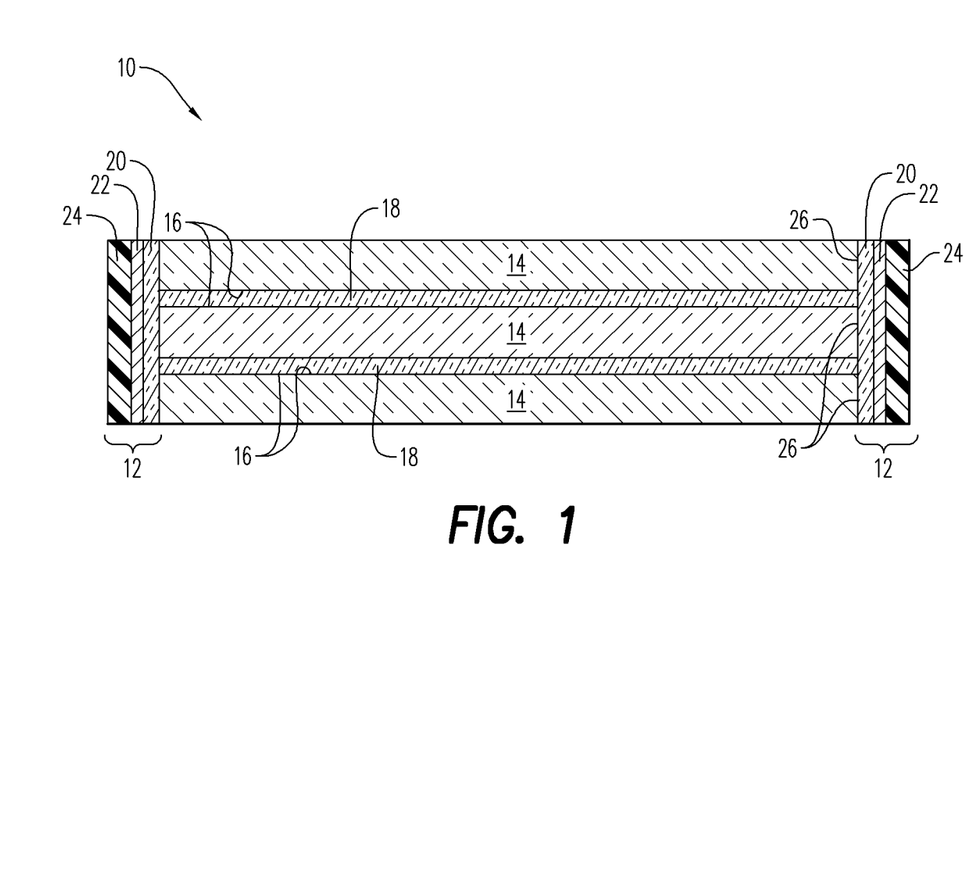
FIG. 1 is a sectional view of an exemplary embodiment of a transparent laminate structure according to the present disclosure.

Referring to the drawings and in particular to FIG. 1, a transparent laminate structure according to an exemplary embodiment of the present disclosure is shown and is generally referred to by reference numeral 10. Advantageously, transparent laminate structure 10 includes an edge seal 12, which mitigates the ingress of moisture and solvents into and/or between the layers and interlayers of the structure.

Many of the prior art transparent laminate structures that have been proposed to address the ingress of moisture into the transparent plastic layers and interlayers through the edges have utilized structures that are specific to water vapor. However, it has surprisingly been determined by the present disclosure that many of these prior art materials and structures employed to mitigate moisture related failures of transparent laminate structures have proven to be the primary source of contamination.

For example, it has been determined that during the manufacture of many transparent laminate structures, the manufacturing environment itself can subject the edges of the laminate structures to solvents. For instance, polycarbonate is not resistant to acetone, concentrated acetic acid, cutting oils, gasoline, ammonia, lacquer thinner, or a host of other chemicals and can be dissolved in creosol among others. The polyether polyurethanes are more chemically resistant than the polyester polyurethanes, but can still exhibit significant swelling and loss of properties when exposed to ethanol, methanol, benzene, carbon tetrachloride, methylene chloride, methyl ethyl ketone, perchloroethylene, toluene, trichloroethylene and certain freons.

Most prior art transparent laminate structures are made using a vacuum bag and autoclave process. During prior art manufacturing techniques, the edges have been wrapped with protective edge seal tapes. However, it has been determined by the present disclosure that the prior art edge seal tapes are made from polyurethane, which is vulnerable to deleterious chemical attack from the solvents encountered in the manufacturing environment, and are perforated to allow air to escape during the autoclave process. It has been determined by the present disclosure that these attributes contribute to the failure of prior art transparent laminate structures.

In addition, many prior art transparent laminate structures are assembled to an outer frame using adhesives and sealants intended to prevent the ingress of moisture at the edges of the structure. The present disclosure has also made the surprising discovery that the gases, vapors, and species liberated at elevated temperatures from uncured regions of these prior art adhesives and sealants contribute to the failure of prior art transparent laminate structures. This has been found by the present disclosure to be particularly true when using polyurethane adhesives that are cured by reaction involving water vapor. As the polyurethane one part adhesive reacts with the water vapor in the air the exposed adhesive cures first, forming a skin, and the remaining adhesive cures as moisture diffuses through the skin.

It has been found by the present disclosure that this region of cured adhesive, which can be centimeters thick, acts as a barrier slowing the ingress of moisture to the uncured regions. It was also found by the present disclosure that when the transparent laminate structure is exposed to elevated temperatures especially in combination with solar energy, the uncured regions of the adhesive liberate vapors and gases at an exponentially increasing rate. The liberated species can include plasticizers which are added to the adhesives to make them pliable and flow, and can migrate due to the cured outer skin, back into the edges of the transparent laminate structure at diffusion rates increased by the temperature and UV.

The migration of the vapors into the transparent laminate structure can degrade the interlayers to the point that they either lose their adhesive properties or lose strength to the point, that especially in high internal stress regions, de-lamination occurs. Similarly, the migration of the vapors into the transparent laminate structure can degrade the transparent plastic layers, can result in surface clouding of the layer and ultimately a loss of physical strength.

It was found by the present disclosure that other curing adhesives, such as two part urethanes which include a catalyst and do not rely on diffusion of moisture for curing, also interact with the interlayers of transparent laminate structures causing delamination in the presence of solar radiation.

In sum, it has surprisingly been determined by the present disclosure that many of the materials, structures, and manufacturing techniques used in prior art transparent laminate structures, which are focused on preventing the ingress of water vapors into the edges of the structure, are actually a primary source of solvent contamination of the structures.

Advantageously, edge seal 12 mitigates the ingress of moisture and solvents into and/or between the layers and interlayers of structure 10.

Structure 10 includes two or more transparent layers 14 of materials such as, but not limited to, glass, glass-ceramics, transparent ceramics, transparent plastics and any combinations thereof. When present, the transparent plastics can include materials such as, but not limited to polycarbonate, PMMA, polyurethane, amides, as a single phase or reinforced with particles or fibers, and any combinations thereof.

Layers 14 of can be arranged in any desired order, have any desired thickness, and have any desired combination of materials necessary to achieve a desired structural or ballistic property. In some embodiments, one or more of layers 14 within structure 10 can be replaced with a spacer (not shown) disposed to define an air gap between layers 14 in a known manner.

Layers 14 are bonded or laminated to one another along their inner faces 16 by an interlayer 18. Interlayer 18 can include materials such as, but not limited to, aliphatic polyether polyurethanes, polyvinyl butyrals (PVB), ethylene, methacrylic acid copolymer, silicones, polyvinyl acetal resins, and any combinations thereof. For example, interlay 18 can be a sandwich interlayer of, for example, polyurethane/pvb/polyurethane, which is known to prevent contact between layers 14 made of polycarbonate and interlayers 18 made of PVB.

Structure 10 further includes edge seal 12, which includes an edge interlayer 20, an inorganic barrier layer 22, and, in some embodiments, a polymer coating 24.

Edge interlayer 20 formed along one or more of side edges 26 of each of layers 14 to seal the side edges of the layers and to seal the interlayers 18 between the layers. In a preferred embodiment, edge interlayer 20 is formed along the entire perimeter of structure 10 such that all of side edges 26 and interlayers 18 within the structure are sealed by edge seal 12.

Edge interlayer 20 is an organic polymer chemically compatible with the material of interlayer 18. In a preferred embodiment, edge interlayer 20 and interlayer 18 formed of the same material such as, but not limited to, aliphatic polyether polyurethanes, polyvinyl butyrals (PVP), ethylene, methacrylic acid copolymer, and silicones.

Inorganic barrier layer 22 is bonded or laminated to edge interlayer 20 and prevents vapor or liquid contaminates from contacting either interlayers 18, 20. Inorganic barrier layer 22 has a desired water vapor transfer rate (WVTR) of less than 10, with less than 5 being more preferred, with less than 2 being most preferred. As used herein, the term water vapor transfer rate (WVTR) is defined as grams of water that pass through a square meter of material in a 24 hour period.

In a preferred embodiment, inorganic barrier layer 22 is made of any inorganic material having the desired water vapor transmission rate such as, but not limited to bare strip or foil of aluminum alloy 8111, stainless steel foil, metal tapes especially with fiber glass backing for perforation resistance, foil faced paper, metalized film, lead film tapes especially if contact with strong acids or basis is anticipated, titanium foil also for superior chemical resistance, Nickel-Silicon alloy foils or strips have the advantage of having a coefficient of thermal expansion that is close to many glasses, copper foils or strips, nickel foils or strips, metalized fabrics, or other metals in foil, strip, ribbon, or sheet. A ceramic, for example, metal oxide, carbide, or nitride coated polymer films that are non-porous including tin oxide, indium tin oxide, titania, silica, titanium carbide, silicon nitride, aluminum nitride among others in single or multiple layers.

In the event that the desired material for inorganic barrier layer 22 is incompatible with adhesives contemplated for use in securing structure 10 into a mounting frame (not shown), the inorganic barrier layer 22 can further include polymer coating 24. Thus, polymer coating 24 can protect layer 22 from physical perforation or chemical attack from adhesives applied to structure 10.

Polymer coating 24 can be any number if elastomeric sealants in the urethane, polysulfide, or silicone family, but specifically should not be from any of the family of silicones that are acetic acid cured, or any other polymer that would liberate acid or otherwise make acid come into contact with barrier layer 22 when made of aluminum foil.

The present disclosure specifically contemplates the use of polymer coating 24 made of polysulfide, which has previously not been useable with transparent laminate structures as polysulfide was previously identified as potentially reacting with urethane interlayers and producing an edge distortion effect.

In addition, it is contemplated by the present disclosure for polymer coating 24 to be applied to the outer surface inorganic interlayer layer 22 for added durability and contamination barrier properties.

Figure 2:
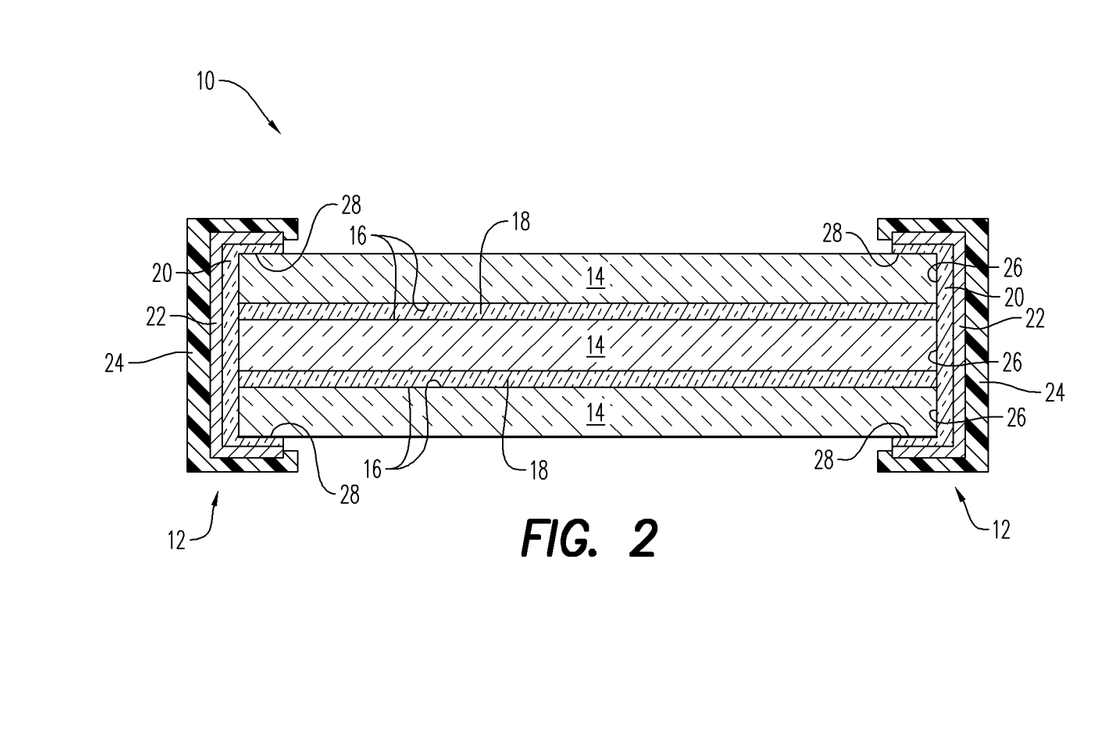
FIG. 2 is a sectional view of a first alternate embodiment of the transparent laminate structure of FIG. 1.

In the embodiment of structure 10 shown in FIG. 2, edge interlayer 20 and inorganic barrier layer 22 extend past side edges 26 and onto a portion of an exterior face 28 of the outermost layers 14. Thus, interlayer 20 bonds or laminates inorganic barrier layer 22 to the portion of face 28.

Figure 3:
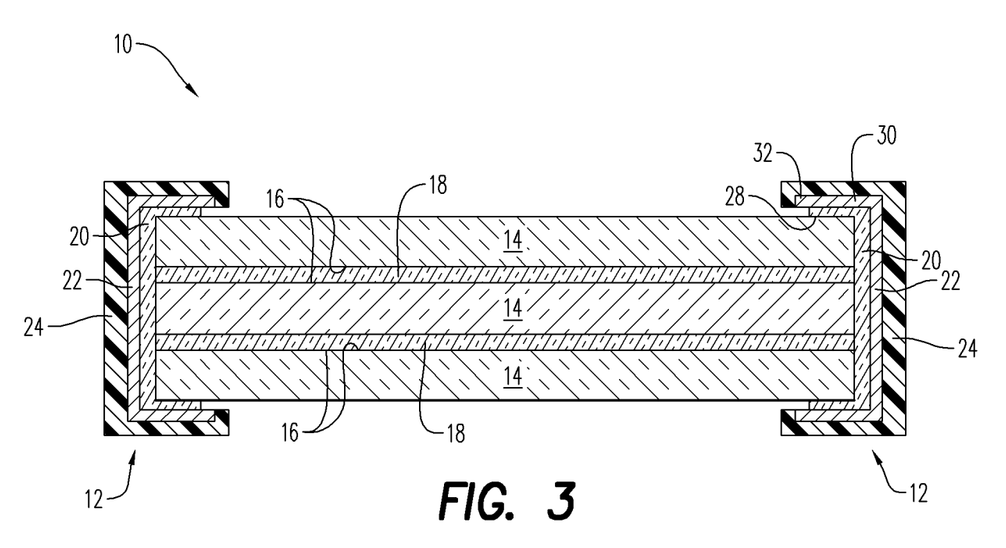
FIG. 3 is a sectional view of a second alternate embodiment of the transparent laminate structure of FIG. 1.

Still further, in the embodiment of structure 10 shown in FIG. 3, inorganic barrier layer 22 extends past interlayer 20 on exterior face 28. Thus, interlayer 20 bonds or laminates a portion 30 of inorganic barrier layer 22 to face 28, while leaving a remaining portion 32 of the inorganic barrier layer unlaminated to layers 14. Subsequently, portion 32 can be compressed against face 28 in a known method to form a seal between the portion 32 and the face, which substantially encapsulates interlayer 20.

Edge interlayer 20, during the heating process used to bond or laminate layers 14 via interlayer 18, simultaneously bonds or laminates inorganic barrier layer 22 thereto. During the heating process edge interlayer 20 softens or sufficiently melts to bond to the glass and plastic layers, while substantially filling in all surface defects and irregularities between edges 26 and inorganic barrier layer 22.

As discussed above, interlayer 18 and interlayer 20 are preferably made of the same material. It has further been determined that common formation of interlayers 18, 20 provides structure 10 with improved resistance to de-lamination from thermal stresses.

For example, and without wishing to be bound to any particular theory, it is believed that as structure 10 cools to room temperature after heating, any glass layers 14 within the structure shrink less than any transparent plastic layers 14 within the structure due to differences in the coefficients of thermal expansion between these materials. The different levels of thermal contraction is believed to result in the interface between the glass layers 14 and transparent plastic layers 14 being in a state of residual shear stress with the stresses being concentrated in areas where the interlayer is discontinuous.

Additionally, when structure 10 is exposed to temperatures below room temperature during normal use, these residual shear stresses and stress concentrations are believed to further increase. Temperature cycling is therefore believed by the present disclosure to result in de-lamination in the concentrated areas of stress where interlayer 18 has not completely filled the gaps between layers 14.

Advantageously, it has been determined that edge seal 12, which has interlayer 18 extending out past edges 26, and in some embodiments onto face 28, to define interlayer 20 can mitigate localized discontinuities at edges 26, spreading out any stresses and thereby minimizing the chance for de-lamination.

Figure 4:
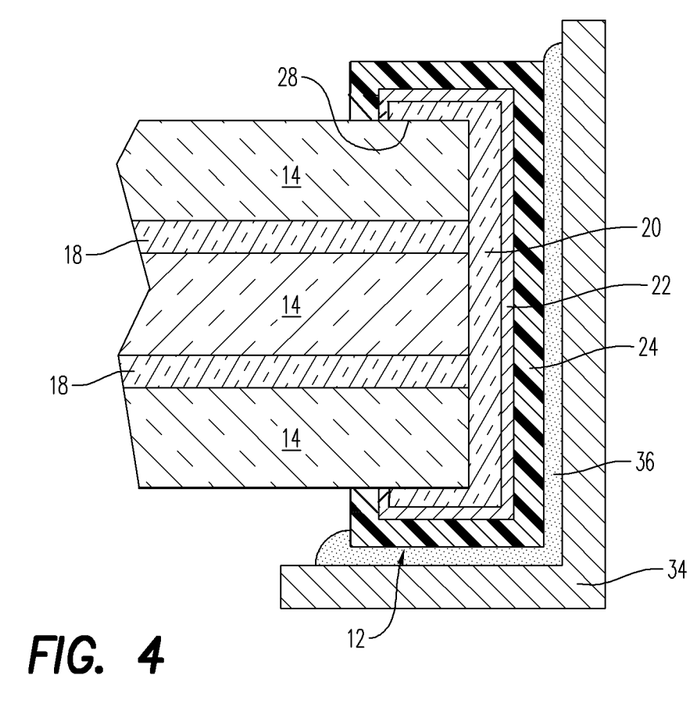
FIG. 4 is a partial sectional view of a further embodiment of the transparent laminate structure of FIG. 2.

Referring now to FIG. 4, structure 10 of FIG. 2 is further shown being mounted within a frame 34 by a potting compound 36. Advantageously, edge seal 12 mitigates contamination of interlayers 18, 20 from potting compound 36.

The method of making structure 10 is described with reference to FIG. 1. The thickness, number, and materials of layers 14 are selected to meet the required ballistic, optical, and environmental requirements desired for structure 10. The type of material for interlayers 18, 20 are then selected based on the materials of layers 14. Preferably, interlayers 18, 20 are made of the same material.

Transparent interlayer 18 is disposed between adjacent transparent layers 14, interlayer 20 is disposed along side edges 26 of transparent layers 14, and barrier layer 22 is disposed on the interlayer 20 to form a pre-laminate structure.

The pre-laminate structure is wrapped in a vacuum bag typically including a layer of woven cloth with an embedded release agent immediately against the structure, then a layer of high loft matting as a breather cloth that allows air and gasses to escape, then the final plastic bagging film that is impervious to air and allows a vacuum to be pulled on the parts drawing out the air and confining the stack. Vacuum is typically pulled to a level of −26 to −28 millimeters (mm) of mercury (Hg). The vacuum bagged pre-laminate structure is loaded into an autoclave, reconnected to vacuum, and subjected to heat and pressure to melt the adhesive interlayers 18, 20 and cause them to bond all the layers 14 and 22 together. The specific time, temperature and pressure cycles are selected in accordance with the specific interlayers, thicknesses, and ballistic requirements.

In a preferred embodiment of the present disclosure, the pre-laminate structure 10 is autoclave processed with a rapid ramp to not more than 120 degrees Celsius and held so that the coolest center of the coolest part in the autoclave is held at 120% of the interlayer's lower softening temperature for at least 15 minutes. Pressure is applied and ramped to 95 psi.

In some embodiments, interlayer 20 and barrier layer 22 can be added to the structure after autoclaving of the pre-laminate structure is completed. Here, the laminated structure of layers 14 and interlayers 18 is wrapped along the side edges 26 with interlayer 20 and barrier layer 22 is applied to the interlayer 20. Next, the structure can be autoclaved a second time to laminate barrier layer 22 thereto.

After removing the structure from the vacuum bags, barrier layer 22 can be optionally coated with polymer coating 24 by spreading the coating over the surface or, if the structure 10 is placed in to the frame 34, the coating may be squeezed down into the gap between the sides of structure and the inside of the frame.

The method of making structure 10 is described above by way of example using an autoclave and vacuum process. However, it should be recognized that any method sufficient to laminate layers 14, 22 to one another via interlayers 18, 20 are contemplated for use by the present disclosure.

EXPERIMENTAL RESULTS

To prove the advantages structure 10 having edge seal 12, two windows were made, one with and one without the barrier layer 22. The structure having barrier layer 22 used aluminum foil as the material for the barrier layer. Neither window had the optional polymer coating 24 and both windows used the same material for interlayers 18, 20, namely an optical aliphatic polyurethane.

Each window was exposed to severe extremes of water, heat and cold, in many cases following the tests specified by the U.S. Army for transparent armor in the purchase description document, ATPD 2352. The first test performed was the standard's ten day hot cold cycle. Both windows passed visual inspection showing no fogging or bubbles or any indication of delaminating.

The second test performed was a 48 hour hot and humid cycle, the windows were held at 60 degrees Celsius and 95% relative humidity for a full 48 hours, no failures were observed for fogging, delaminating or moisture intrusion.

The third test performed was a 48 hour cold cycle. The windows were run strait from the end of the hot test above so the windows also experienced a temp shock as they went from about 50 C to −50 C in under 3 hours. The windows were very wet following the hot and humid cycle above so this test also tested ice formation damage on the aluminum barrier layer 22. The results were no fogging, delaminating for moisture intrusion.

The fourth test performed was a submersion in water test for over 24 hours then put into the chamber for a 48 hour hot and humid test (60 C and 95% RH), and still no evidence of any failure.

In the final test, a solvent other than water was used in a submersion test. Each window was placed in a pan of ethanol and left overnight. The next day the window without aluminum barrier layer 22 had severe degradation of interlayers 18, 20 which were ragged and frayed while the window having aluminum barrier layer 22 showed no signs of degradation.

Figure 5:
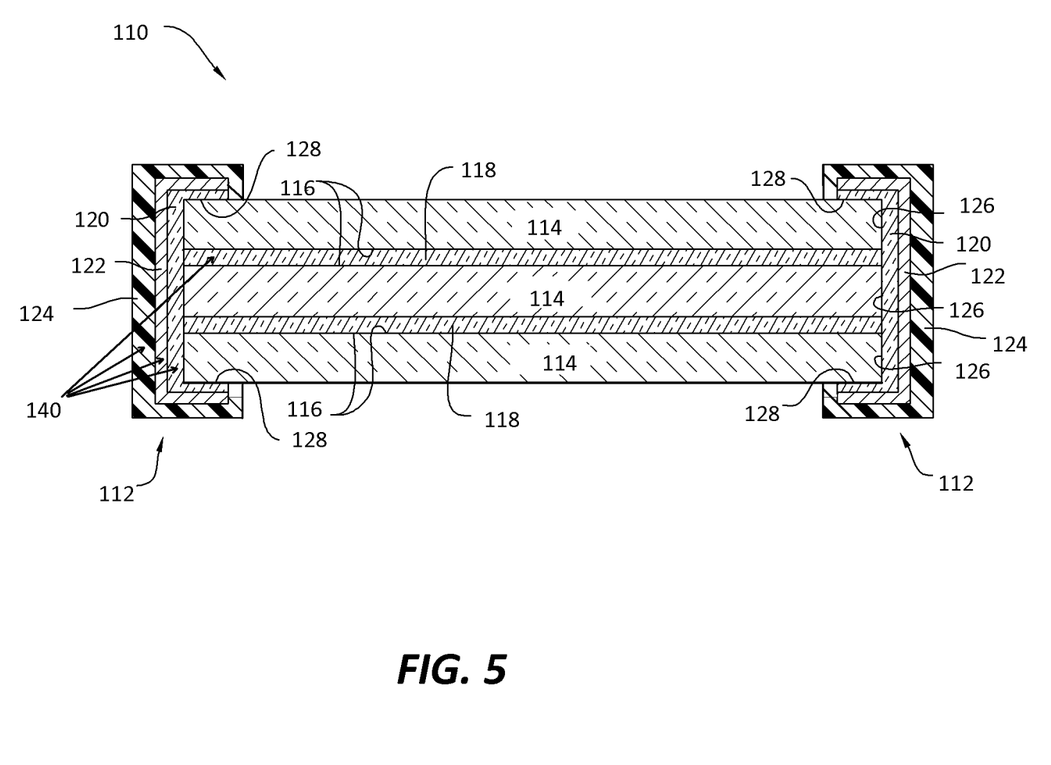
FIG. 5 is a sectional view of another alternate embodiment of a transparent laminate structure according to the present disclosure.

Referring now to FIG. 5, an alternate exemplary embodiment of a transparent laminate structure is shown and is generally referred to by reference numeral 110. Here, component parts performing similar and/or analogous functions are labeled in multiples of one hundred with respect to the embodiments of FIGS. 1-4.

Structure 110 includes edge seal 112 and layers 114 that are bonded or laminated to one another along their inner faces 116 by an interlayer 118. Edge seal 112 includes edge interlayer 120, inorganic barrier layer 122, and, in some embodiments, a polymer coating 124.

Edge interlayer 120 is formed along one or more of side edges 126 of each of layers. Additionally, edge interlayer 120 and/or inorganic barrier layer 122 can, in some embodiments, extend past side edges 126 and onto a portion of an exterior face 128 of the outermost layers 114. Further, inorganic barrier layer 122 can extend past interlayer 120 on exterior face 128 to bond or laminates a portion (not shown) of inorganic barrier layer 122 to face 128, while leaving a remaining portion (not shown) of the inorganic barrier layer unlaminated to layers 114.

Advantageously, structure 110 further includes a dessicant 140 that is configured to absorb and/or adsorb moisture that infiltrates the structure. Dessicant 140 can be dispersed in one or more portions of edge seal 112 such as within one or more of interlayer 120, inorganic barrier layer 122, and polymer coating 124, and/or can be dispersed in interlayer 118. Alternately, dessicant 140 can be formed as a separate layer (not shown) within one or more portions of edge seal 112.

Desiccant 140 can be any material or substance that is hygroscopic in nature. Desiccant 140 can work through chemical bonding of water molecules and be chemically inert. For example, dessicant 140 can be one or materials such as, but not limited to, activated alumina, aerogel, benzophenone, bentonite clay, calcium chloride, calcium sulfate, cobalt(ii) chloride, copper(ii) sulfate, lithium chloride, lithium bromide, magnesium sulfate, magnesium perchlorate, molecular sieve, potassium carbonate, silica gel, sodium, sodium chlorate, sodium chloride, sodium hydroxide, sodium sulfate, sucrose, and any combinations thereof.

In some embodiments, desiccant 140 is milled down to sub-micron particle size and suspended in the interlayer 118 and/or barrier layer 120. It has been determined that interlayer 118 retains its optical transmission properties so long as the desiccant 140 has a size of 100 nanometers or smaller, which is believed to minimize scattering of visible light. Suitable materials for this approach would capture water molecules through a process of adsorption where their presence would not change the inherent chemistry of the adhesive layer itself.

Example of such material would be activated alumina or other molecular sieves where the small water molecules can fit into openings and pores of alumina for instance. It is also advantageous that activated alumina could be re-activated (restored to original condition) at temperatures exceeding 200° C. These temperatures are beyond operational temperatures of the transparent armor hence eliminating any chance of releasing the trapped moisture back into the bulk adhesive material.

In other embodiments, dessicant 140 can be silica, carbon or alumina aerogels, which offer excellent desiccant properties but in addition offer excellent thermal insulation properties as well as low density. For example, it is contemplated by the present disclosure for dessicant 140 to be a transparent silica aerogel.

Figure 6:
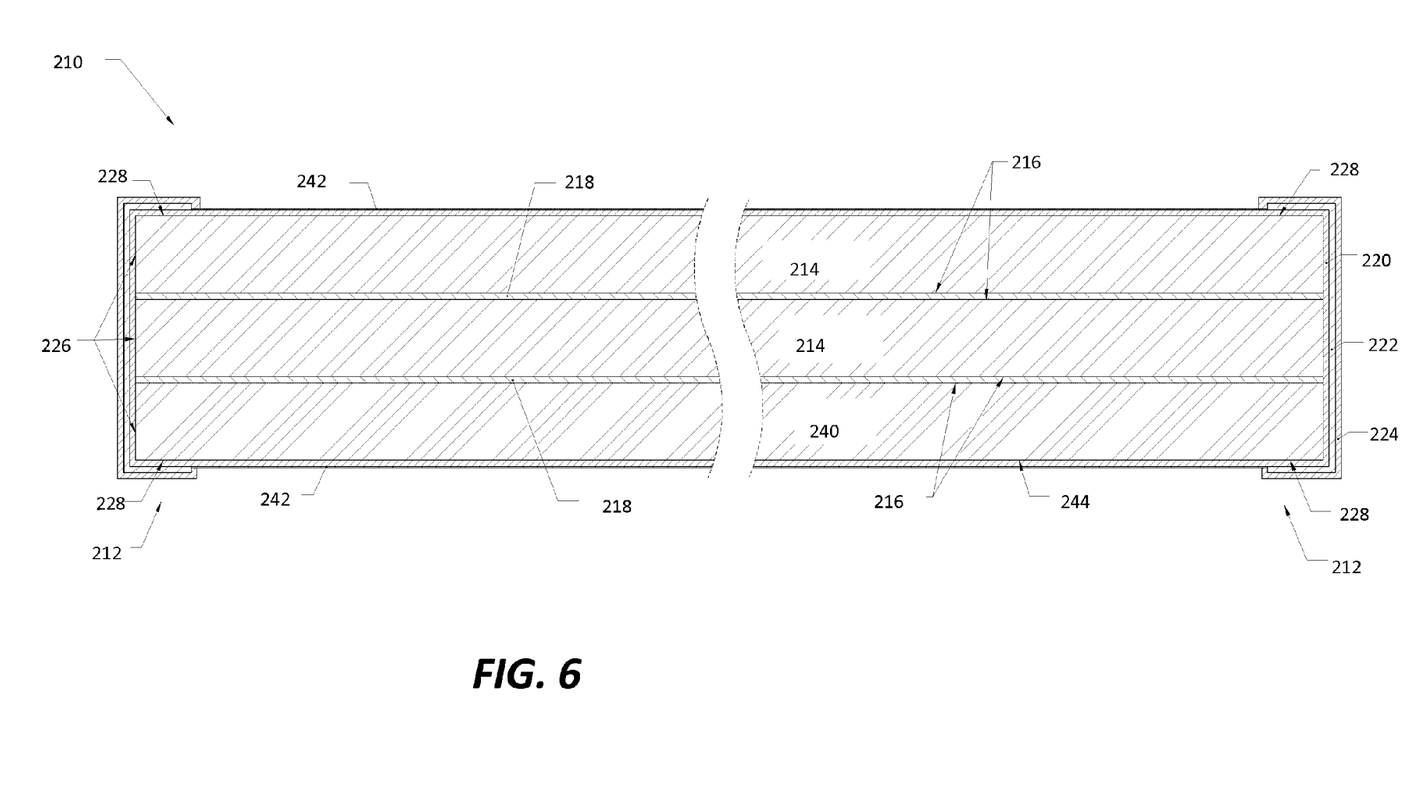
FIG. 6 is a sectional view of another alternate embodiment of a transparent laminate structure according to the present disclosure.

Referring now to FIG. 6, an alternate exemplary embodiment of a transparent laminate structure is shown and is generally referred to by reference numeral 210. Here, component parts performing similar and/or analogous functions are labeled in multiples of two hundred with respect to the embodiments of FIGS. 1-4.

Structure 210 includes edge seal 212 and layers 214 that are bonded or laminated to one another along their inner faces 216 by an interlayer 218. Edge seal 212 includes edge interlayer 220, inorganic barrier layer 222, and, in some embodiments, a polymer coating 224. In structure 210, one of layers 214 is a transparent polymer spall layer 240 on a safe side of the armor, which catches broken pieces of glass and extant penetrator pieces.

Without wishing to be bound by any particular theory, it is believed by the present disclosure that moisture and chemical permeation into prior art transparent armor structures are the cause of the poor delamination-resistance exhibited by the prior art structures. It is believed by the present disclosure that the moisture and chemicals permeate into the structure through the safe side transparent polymer spall liner that is exposed to the environment.

Advantageously, structure 210 resolves several issues present in prior art structures. Specifically, structure 210 provides for an improved bond between spall layer 240 and its adjoining layer 214 or 242 that is and includes a moisture and scratch resistant barrier to prevent or mitigate moisture and solvent ingress into the structure through the external layer and spall layer. In this manner, structure 210 resists delamination aggravated by elevated temperatures, internal stresses, migration of solvents or moisture during the manufacturing or service life of the structure.

Most vehicles using transparent laminate structures for armor for instance are required to operate at 49 degrees Celsius (° C.) and ambient temperatures on earth have been reported at 58° C. It has been determined by the present disclosure that the internal temperature of transparent armor structure 210, when exposed to solar loading, can experience temperatures at 76° C. when the vehicle temperature was only 49° C. Thus, it has been determined by the present disclosure that transparent armor structure 210 can show a solar gain of up to 27° C.

Accordingly, interlayer 218 and/or interlayer 220 has a softening point or TMA onset temperature above 76 degrees Celsius (° C.) and preferably above 85° C. For example, interlayers 218, 220 can be made of transparent optical grade aliphatic polyurethane with TMA onset of softening temperatures of 90 to 114° C. for retained strength at elevated temperatures and which includes a silane additive for enhanced bonding to glass, glass-ceramics, and transparent ceramics. Silane is an organometallic compound that provides bonding and reactions between dissimilar materials such as an organic on one side and an inorganic on the other.

The effectiveness of high TMA onset bonds was demonstrated in accelerated solar loading tests where samples are exposed to cycles of 1120 W/m$^2$ for 20 hours than 4 hours of dark. Transparent laminates representative of prior art constructed of glass, glass-ceramic, and polycarbonate bonded together with aliphatic polyurethane with a TMA onset of 76-80° C. and potted in a steel frame with a one part moisture cure polyurethane potting compound exhibited delamination in less than 56 cycles at glass or glass-ceramic to glass or glass-ceramic bond lines and bond lines next to polycarbonate. Structure 210 where contact with the potting compound was barred and interlayers 218, 220, 242 with a TMA onset of 90-114° C. were used exhibited a small region of delamination in one sample after 94 cycles. In six other samples there was no delamination after 112 cycles.

Of course, interlayers 218, 220 can be any desired transparent adhesive such as, but not limited to aliphatic polyurethanes or poly(vinyl butyral)s, ethylene-vinyl acetate, ethylene/methacrylic acid copolymer, silicone, epoxies, and any combinations thereof that meet the optical and structural requirements.

Spall layer 240 can be any transparent polymer layer such as polycarbonate (PC) or polymethyl methacrylate (PMMA), also known as acrylic glass, which are on the order of the thicknesses of the glass layers 214. Spall layer 240, preferably, has a water content of at most 40% of room temperature saturation and preferably only 20% of room temperature saturation and most preferable zero. For example, spall layer 240 made of polycarbonate having a room temperature saturation of 0.137 w/% or less is preferred.

It is contemplated by the present disclosure for spall layer 240 and/or interlayers 218, 220 to be exposed to a water removal process before assembly to ensure the desired room temperature saturation.

Figure 7:
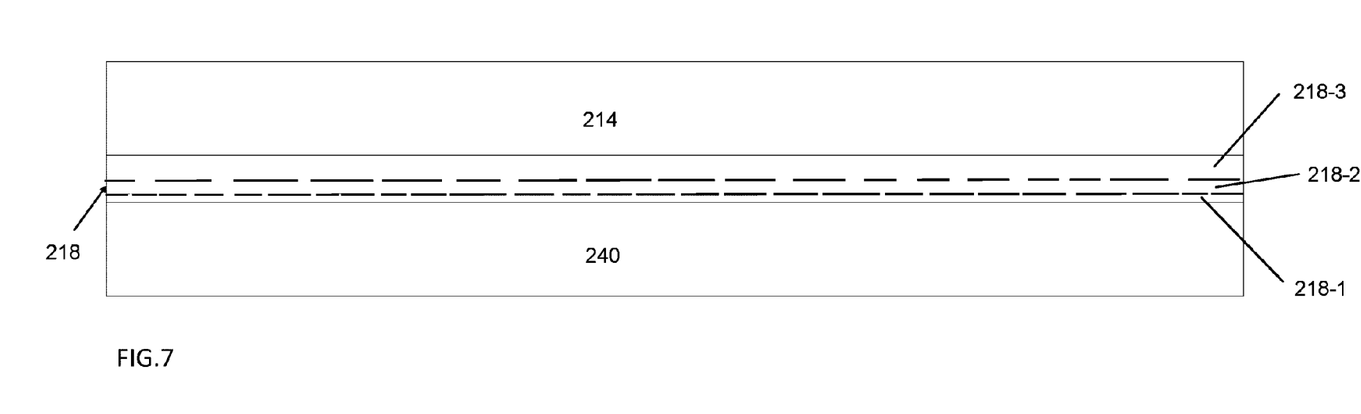
FIG. 7 is a sectional view illustrating an exemplary embodiment of a hybrid interlayer according to the present disclosure.

In some embodiments, interlayer 218 is a hybrid or graded bonding layer illustrated in FIG. 7. Here, interlayer 218 includes a first region 218-1 that is a mixture of polycarbonate and polyurethane where in contact with the polycarbonate spall layer 240 and a second region 218-2 that is predominantly polyurethane in contact with glass layers 214. In some embodiments, interlayer 218 can further transition from second region 218-1 to a third region 218-3 that is exclusively polyurethane proximate glass layers 214, which absorbs stresses due to mismatching coefficients of thermal expansion between the glass and polycarbonate layers.

Thus, interlayer 218, when in a hybrid or graded form, transitions from a mixture of polycarbonate and polyurethane (region 218-1) to predominantly polyurethane (region 218-2), and, when present, exclusively polyurethane (region 218-3). In this manner, interlayer 218 allows for a chemical bond between region 218-1 and polycarbonate spall layer 240 and a mechanical bond between region 218-2 or 218-3 and glass layer 214. The polyurethane of region 218-2 or, when present region 218-3, preferably includes adhesions promoters such as a silanes to promote, in addition to the aforementioned mechanical bond, a chemical bond to the glass layer 214.

Although not discussed, it is contemplated by the present disclosure for interlayer 220 to also be a hybrid or graded interlayer. Additionally, in embodiments where structure 210 includes two polycarbonate layers 214 bonded to one another, interlayer 218 can, instead of region 218-3 that is exclusively polyurethane, have a second first region 218-1, forming a chemical bond to the second polycarbonate layer 214.

The graded or hybrid interlayer 218 of polyurethane with polycarbonate can be made for example by laying the desired hard, stiff interlayer (e.g. E-modulus at 100% strain of 1800 psi) sheets against the polycarbonate and laying the solid sheet of softer, compliant aliphatic polyurethane (e.g. E-modulus at 100% strain of 280 psi) for example in between the sheets of the hard ones. The stack is vacuum bagged and then heated in an autoclave under temperature and pressure. To form the strong mixture of polycarbonate and polyurethane the stack is heated to above the glass transition temperature of the polycarbonate (typically 150 deg C.), which also above the glass transition temperature, and preferably above the TMA onset, of the polyurethane. The mixing occurs at this temperature via diffusion of polymer chains across the initially sharp polycarbonate-polyurethane interface with enough time, and is accelerated with higher temperatures. This mixing is allowed to occur to a sufficient extent to transform the initially sharp polycarbonate-polyurethane interface into an interphase of mixed polycarbonate and polyurethane polymer chains. Pressure, typically 95 psi, is applied to suppress bubble formation.

Adhesion tests were performed on samples made with the hybrid interlayer 218 including the polyurethane/polycarbonate mixed region. The adhesion samples consisted of a 1" wide bar of 0.22" thick polycarbonate bonded to a 3"×3"× 0.22" base plate of polycarbonate. The 1" bar over hung the base plate by 1". A line load was applied to the underside of the overhang to "peel" the polycarbonate bar off of the base plate. In a control sample without the mixed polycarbonate/polyurethane hybrid region the polycarbonate bar bends and the interlayer pulls away exhibiting adhesive failure from the polycarbonate surface. With the hybrid region, however, the polycarbonate tab breaks off before the adhesions fails.

Advantageously, structure 210 includes both hybrid or graded interlayer 218 and edge seal 212. Thus, structure 210 mitigates entry of moisture and solvents into the structure via edge seal 212 and mitigates delamination of spall layer 240 from glass layer 214 if solvents or moisture migrate into the bond regions via hybrid or graded interlayer 218.

An alternative method to make the hybrid or graded interlayer 218 is to use a solvent that dissolves both the polycarbonate spall layer 214 and polyurethane interlayer 218, such as methylene chloride. In this case, polyurethane is dissolved in the solvent and applied to the polycarbonate spall layer 240 using spray coating, dip coating, or other coating methods known in the art. The solvent partially dissolves the surface of the polycarbonate spall layer 240 and allows polyurethane chains to diffuse into the surface of the spall layer, providing the same mixed polycarbonate-polyurethane interphase described above. The solvent is allowed to evaporate. Additional thermal treatments can be applied to assure complete removal of residual solvent or for removing residual surface stresses introduced during the solvent treatment.

Peel test samples made using this solvent assist process also resulted in the polycarbonate over hanging tab breaking off rather than the adhesive failure seen in the control samples.

An important characteristic of structure 210 including the hybrid or graded interlayer 218 is the necessity for sufficient optical transmission for good visibility with the human eye or aided by night vision goggles. Transmission was tested on the peel test samples which were made with two layers 214 of 0.22" polycarbonate bonded together with a 0.025" hybrid or graded interlayer 218 of optical aliphatic polyurethane on each side next to the polycarbonate layers. A control sample did not have the graded interlayer. Photopic transmission and NVG transmission were measured and calculated according to ATPD 2352 Rev R. The control sample exhibited photopic transmission from 88.0 to 88.4%, and NVG transmission from 87.8 to 88.8%. The samples with the hybrid or graded interlayer 218 exhibited sufficient transmission; an average photopic transmission of 87.3% and as high as 90.2%, and an average NVG transmission of 88.4% and as high as 90.8%.

Referring again to FIG. 6, structure 210 can further include a second inorganic barrier layer 242 laminated to an outer face of layers 214. Barrier layer mitigates or prevents moisture and solvent ingress into layers 214 and particularly spall layer 240, which is made of polycarbonate or other transparent polymer material.

In some embodiments, barrier layer 242 is preferably a thin glass, glass-ceramic, or transparent ceramic laminated to layers 214, 240 by interlayer 244. In some embodiments, interlayer 244 can be a continuation of interlayer 220, while in other embodiments interlayer 244 can be made of a different material than interlayer 220.

Prior art transparent armor structures have rejected using glass on the safe side since even if the bullet is stopped by the structure, the last layer of glass breaks and sends spall flying behind the armor. Structure 210 solves this problem by making this last layer 242 of glass so thin that it cannot support out of plane stresses and, thus, cannot support the formation of the crack network necessary for spall. Any cracked glass from barrier layer 242 remains bonded to the polymer spall layer 240. Although the thickness of barrier layer 242 is threat dependent, it has been determined by the present disclosure that against rifle rounds, thin glass approximately 3 millimeters (mm) and thinner exhibits little if any transverse cracking and is retained except in the region within about 3 projectile diameters from the impact site.

Another problem with bonding barrier layer 242 to the polymer spall layer 240 is the coefficient of thermal expansion mismatch between the glass of the barrier layer, the polymer of the spall layer, and the polymer of the bonding material could cause the thin barrier layer to develop tensile bending stresses and to break at temperature extremes. Advantageously, it has been determined that making barrier layer 242 thin enough so it does not support shear addresses this problem too.

Barrier layer 242 is thick enough that it cannot be scratched through which would open a path for moisture or solvent ingress Scratch tests in borosilicate glass with diamond scribes show that scratches as deep as 60 microns are just visible, thus in the embodiment using a borosilicate glass for barrier layer 242, the layer has a thickness of at least 50 microns.

In other embodiments, barrier layer 242 is a polymer film or sheet pre-coated with an inorganic coating such as metal oxides or silicon dioxide and having a thickness typically not more than 0.06". Here, barrier layer 242 is bonded to layers 214, 240 by interlayer 244. Since barrier layer 242 in the form of a thin film lacks rigidity, it has been determined that interlayer 244 must be a stiff layer to ensure no bunching of the barrier layer, no distortion, and high transparency. For example, barrier layer 242 including a 0.002" film of PET/moisture barrier coating/PET was bonded using an interlayer 244 of an aliphatic polyurethane film having an E-modulus at 100% strain of 1800 pounds per square inch (psi) and a thickness of about 0.008". It should be recognized that interlayer 244 can be a hybrid or graded interlayer as discussed herein above.

In still other embodiments, barrier layer 242 can be a coating of silicon dioxide applied directly to spall layer 240. In other embodiments, spall layer 240 is entirely encapsulated in barrier layer 242 before assembly into structure 210.

It has been determined by the present disclosure that the polymer spall layer 240 is a source of moisture that can lead to delamination especially in combination with contaminants from potting compounds. It is advantageous to encapsulate spall layer 240 or any transparent polymer layers 214 in deposited barrier later 242 to block the moisture from migrating to the interlayers 218, 220, 244 and accelerating delamination. In the tests showing this phenomena, samples were constructed of polycarbonate layer 240 bonded to boroslicate glass layer 242 with a thermoplastic optical aliphatic polyurethane interlayer 244. Some of the sample edges were in contact with a black polyurethane potting compound and others were not. In some of the samples, the polycarbonate layer 240 had been preconditioned in 30-40% relative humidity conditions, and in others the polycarbonate layer 240 was preconditioned in 70-80% relative humidity, which represents humidity levels present in a typical manufacturing atmosphere much of the year. The samples were exposed to simulated solar loading cycles of 1120 W/m$^2$ for 20 hours followed by 4 hours of dark. All of the samples in contact with the potting compound started to delaminate in 56 cycles or less. Those that had the polycarbonate pre-conditioned at the 70-80% relative humidity showed delamination in 21 cycles and by the 56$^{th}$ cycle the delamination region covered approximately 90% of the potting compound edged sample.

Figure 8:
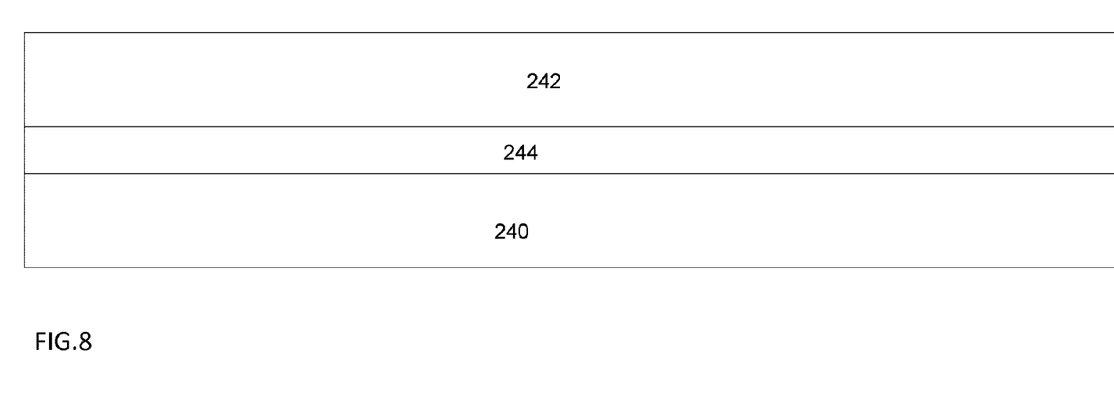
FIG. 8 is a sectional view illustrating an exemplary embodiment of a deposited interlayer according to the present disclosure.

Additionally, the deposition of barrier layer 242 directly on polymer spall layer 240 allows a chemical bond to be made between the deposited layer 242 and interlayer 218, 244, which further mitigates delamination.

Spall layer 240 can be coated or encapsulated by, for example, applying tetraethyl orthosilicate (TEOS) directly to the spall layer to create a glassy chemical bond with the polymer spall layer. Alternately, the coating or encapsulation can be applied by plasma treatments, including RF discharge, corona discharge, blown jet plasmas, or other plasma methods known in the art, with chemical precursors such as silane, TEOS, hexamethyldisilazane, and hexamethyldisiloxane to form a well bonded silicon dioxide layer on polycarbonate spall layer 240.

In some embodiments, the surface of spall layer 240 can be activated using plasma, interaction of UV radiation, or highly accelerated ions. Without wishing to be bound to any particular theory, it is believed that the activation breaks covalent bonds at the surface of the polymer layer 240, which produces highly reactive chemical species that serve as sites for attachment of other chemical species, such as the silicon-containing ones produced in the plasma. The combination of plasma activation of the surface and treatment of this surface with activated silicon-containing molecules allows the covalently attachment of silicon species, which can react directly with the adhesion promoters that are compounded into commercially available interlayers 244.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A transparent laminate structure, comprising:
    two transparent layers each having an inner face, an outer face, and a side edge;
    a transparent interlayer interposed between and laminating the inner faces of the two transparent layers to one another, the transparent interlayer extending over the side edges and outer faces of the two transparent layers; and
    an inorganic barrier layer that extends past the transparent interlayer so that a portion of the inorganic barrier layer is laminated by the transparent interlayer to the outer faces of the two transparent layers and a remaining portion of the inorganic barrier layer remains unlaminated to the outer faces of the two transparent layers.

2. The transparent laminate structure of claim 1, wherein the inorganic barrier layer comprises a metal layer.

3. The transparent laminate structure of claim 1, wherein the inorganic barrier layer comprises aluminum.

4. The transparent laminate structure of claim 1, where in the inorganic barrier layer comprises a ceramic layer.

5. The transparent laminate structure of claim 1, wherein the remaining portion of the inorganic barrier layer is compressed against the outer faces of the two transparent layers to form a seal that encapsulates the transparent interlayer.

6. The transparent laminate structure of claim 1, further comprising a second inorganic barrier layer laminated to the outer face of one of the two transparent layers, the second inorganic barrier layer comprising a transparent layer selected from the group consisting of glass, glass-ceramic, and ceramic and having a thickness of less than 3 millimeters.

7. The transparent laminate structure of claim 1, wherein the transparent interlayer comprises a softening point above 76 degrees Celsius.

8. The transparent laminate structure of claim 7, wherein the softening point is between 90 to 114 degrees Celsius.

9. The transparent laminate structure of claim 1, wherein the two transparent layers comprise a polycarbonate layer and a layer comprising a material selected from the group consisting of glass, glass-ceramic, and ceramic.

10. The transparent laminate structure of claim 9, wherein the transparent interlayer comprises a hybrid interlayer.

11. A transparent laminate structure, comprising:
    two transparent layers each having an inner face and a side edge;
    a transparent interlayer interposed between and laminating the inner faces of the two transparent layers to one another, the transparent interlayer extending over the side edges of the two transparent layers;
    an inorganic barrier layer laminated to at least the side edges by the transparent interlayer, wherein the two transparent layers comprise a polycarbonate layer and a layer comprising a material selected from the group consisting of glass, glass-ceramic, and ceramic; and
    a silicon dioxide layer deposited on the polycarbonate layer between the transparent interlayer and the polycarbonate layer.

12. A transparent laminate structure, comprising:
    two transparent layers each having an inner face, wherein the two transparent layers comprise a polycarbonate layer and a second layer comprising a material selected from the group consisting of glass, glass-ceramic, and ceramic; and
    a transparent interlayer interposed between and laminating the inner faces of the two transparent layers to one another, wherein the transparent interlayer comprises a hybrid interlayer having a first region having a mixture of polycarbonate and polyurethane in contact with the polycarbonate layer and a second region that is predominantly polyurethane proximate to the second layer, wherein the hybrid interlayer transitions from the mixture of polycarbonate and polyurethane to the predominantly polyurethane.

13. The transparent laminate structure of claim 12, wherein the second region is in contact with the second layer.

14. The transparent laminate structure of claim 12, wherein the transparent interlayer further comprises a third region that is exclusively polyurethane between the second region and the second layer.

15. The transparent laminate structure of claim 12, wherein the transparent interlayer comprises a softening point above 76 degrees Celsius.

16. The transparent laminate structure of claim 15, wherein the softening point is between 90 to 114 degrees Celsius.

17. The transparent laminate structure of claim 12, wherein the transparent interlayer extends at least over the side edges of the two transparent layers.

18. The transparent laminate structure of claim 17, further comprising an inorganic barrier layer laminated to at least the side edges by the transparent interlayer.

19. The transparent laminate structure of claim 17, further comprising an inorganic barrier layer laminated to an outer face of the polycarbonate layer.

20. The transparent laminate structure of claim 19, wherein the inorganic barrier layer comprises a transparent layer selected from the group consisting of glass, glass-ceramic, and ceramic, the layer having a thickness of less than 3 millimeters.

21. A transparent laminate structure, comprising:
a transparent polycarbonate spall layer having an inner face;
a transparent silicon dioxide layer deposited on the inner face of the spall layer;
a transparent rigid layer having an inner face, the rigid transparent layer comprising a material selected from the group consisting of glass, glass-ceramic, and ceramic; and
a transparent polyurethane interlayer interposed between and laminating the inner faces of the transparent polycarbonate spall layer and the rigid transparent layer to one another.

22. The transparent laminate structure of claim 21, wherein the transparent silicon dioxide layer encapsulates the spall layer.

23. The transparent laminate structure of claim 22, wherein the transparent polyurethane interlayer comprises a softening point above 76 degrees Celsius.

24. The transparent laminate structure of claim 22, wherein the transparent polyurethane interlayer extends over side edges of the spall layer and the rigid layer.

25. The transparent laminate structure of claim 24, further comprising an inorganic barrier layer laminated to at least the side edges by the transparent polyurethane interlayer.

26. The transparent laminate structure of claim 25, wherein the inorganic barrier layer comprises a metal layer at least at the side edges.

27. The transparent laminate structure of claim 22, further comprising an inorganic barrier layer laminated to an outer face of the spall layer, the inorganic barrier layer comprising a transparent layer selected from the group consisting of glass, glass-ceramic, and ceramic, the layer having a thickness of less than 3 millimeters.

* * * * *